(12) United States Patent
Peterson et al.

(10) Patent No.: US 9,086,131 B2
(45) Date of Patent: Jul. 21, 2015

(54) GEARBOX OUTPUT SEAL

(71) Applicant: SILVER II US HOLDINGS, LLC, Windsor Locks, CT (US)

(72) Inventors: Steven Peterson, Littleton, CO (US); Ronald P. Rickert, Arvada, CO (US)

(73) Assignee: Silver II US Holdings, LLC, Windsor Locks, CT (US)

( * ) Notice: Subject to any disclaimer, the term of this patent is extended or adjusted under 35 U.S.C. 154(b) by 26 days.

(21) Appl. No.: 13/748,717

(22) Filed: Jan. 24, 2013

(65) Prior Publication Data

US 2014/0202281 A1    Jul. 24, 2014

(51) Int. Cl.
*F16H 57/02* (2012.01)
*F16H 57/029* (2012.01)
*F16J 15/34* (2006.01)

(52) U.S. Cl.
CPC ............. *F16H 57/029* (2013.01); *F16J 15/348* (2013.01); *Y10T 74/2186* (2015.01)

(58) Field of Classification Search
USPC ......... 74/606 R; 277/357, 361, 362, 363, 364
See application file for complete search history.

(56) References Cited

U.S. PATENT DOCUMENTS

| | | | | |
|---|---|---|---|---|
| 2,430,426 | A | * | 11/1947 | Katcher ..................... 277/395 |
| 2,500,359 | A | * | 3/1950 | Jewett .......................... 277/362 |
| 4,991,858 | A | | 2/1991 | Abila et al. |
| 5,658,127 | A | | 8/1997 | Bond et al. |
| 5,983,852 | A | | 11/1999 | Weitz et al. |
| 6,820,822 | B2 | | 11/2004 | Daniels |
| 6,869,381 | B2 | | 3/2005 | Chang |
| 7,056,087 | B2 | | 6/2006 | Dean |
| 7,080,591 | B2 | | 7/2006 | Doherty |
| 7,900,429 | B2 | * | 3/2011 | Labar ............................ 56/16.8 |
| 7,959,532 | B2 | | 6/2011 | Suciu et al. |
| 8,049,386 | B2 | | 11/2011 | Vanderzyden |
| 8,083,236 | B2 | | 12/2011 | Colson et al. |
| 8,172,512 | B2 | | 5/2012 | Short et al. |
| 8,622,697 | B2 | * | 1/2014 | Bortoli et al. ...................... 416/1 |

(Continued)

FOREIGN PATENT DOCUMENTS

DE       3319041 C2 * 12/1991
EP       1921356 A1 *  5/2008 ............... F16J 15/34

OTHER PUBLICATIONS

Sundyne LMV-333 Pumps, Instruction and Operation Manual, Aug. 2007, cited in corresponding int'l appl. PCT/US201/012629.

(Continued)

*Primary Examiner* — Vicky Johnson
(74) *Attorney, Agent, or Firm* — Carlson, Gaskey & Olds, PC

(57) ABSTRACT

A seal assembly for use in a gearbox has a rotating ring to be secured to a shaft, and having a contact face. The contact face abuts a stationary seal. The stationary seal has a retainer with a channel extending to a bottom. A floating seal portion is positioned within the retainer, with a spring positioned between an inner end of the floating seal portion, and biasing the floating seal portion outwardly. There is an inner bore of the retainer which is spaced from an outer periphery of the floating seal portion. One of the inner bore and the outer periphery presides with the plurality of radially located pins. The other of the inner bore and the outer periphery is formed with the plurality of recesses. The pins are received in the recesses, to prevent rotation of the floating seal portion within the retainer.

24 Claims, 3 Drawing Sheets

(56) References Cited

U.S. PATENT DOCUMENTS

2001/0007385 A1\* 7/2001 Lebeau et al. ............... 277/362
2007/0182102 A1\* 8/2007 Mormile et al. ............. 277/361
2011/0024987 A1\* 2/2011 Crowley ...................... 277/306
2011/0121518 A1\* 5/2011 Peng ............................ 277/404
2011/0132667 A1   6/2011 Smallman et al.

OTHER PUBLICATIONS

Search Report from corresponding int'l appl. PCT/US201/012629, dated May 12, 2014.

\* cited by examiner

GEARBOX OUTPUT SEAL

BACKGROUND OF THE INVENTION

This application relates to improvements in an output seal for use in a gearbox.

Gearboxes are known, and typically include an input shaft driving an output shaft through a plurality of gears. The gears may provide a speed change from the input shaft to the output shaft, or any number of other functions, such as driving a plurality of components from a single input. In one known gearbox, two gearbox housings abut each other, and receive oil for lubricating the gears. A seal located at the bottom of the housing has typically included a rotating ring which rotates with a shaft extending through a bore in the housing. A stationary seal sits within the housing and has a face in abutting engagement with the rotating ring to provide a seal, preventing lubricant from leaking through the bore of the gearbox.

The prior art has any number of different seal designs, however, it is somewhat challenging to provide a simple sealing system that is mechanically robust, adequately prevents leakage and offers a reliable and predictable life expectancy.

SUMMARY OF THE INVENTION

A seal assembly for use in a gearbox has a rotating ring to be secured to a shaft, and having a contact face. The contact face abuts a stationary seal. The stationary seal has a retainer with a channel extending to a bottom. A floating seal portion is positioned within the retainer and a spring is positioned within the channel between an inner end of the floating seal portion, and biasing the floating seal portion outwardly. There is an inner bore of the retainer which is spaced from an outer periphery of the floating seal portion. One of the inner bore and the outer periphery has a plurality of radially located pins. The other of the inner bore and the outer periphery is formed with the plurality of recesses. The pins are received in the recesses, to prevent rotation of the floating seal portion within the retainer.

These and other features may be best understood from the following drawings and specification.

DETAILED DESCRIPTION

Figure 1:
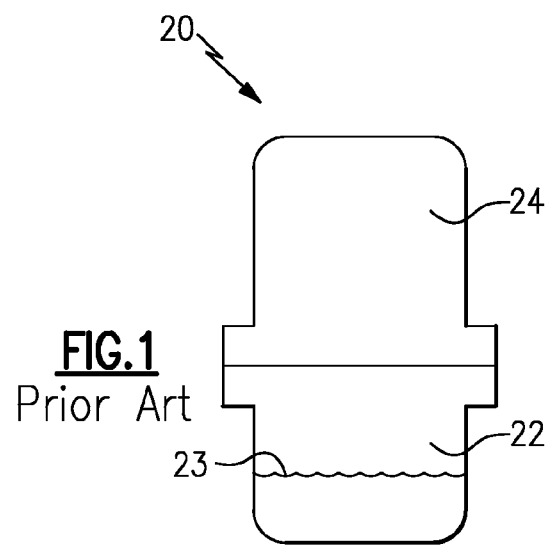
FIG. 1 shows a gearbox.

As shown in FIG. 1, a gearbox 20 incorporates an upper housing 24 and a lower housing 22. An oil level 23 is typically provided within the lower housing 22.

Figure 2:
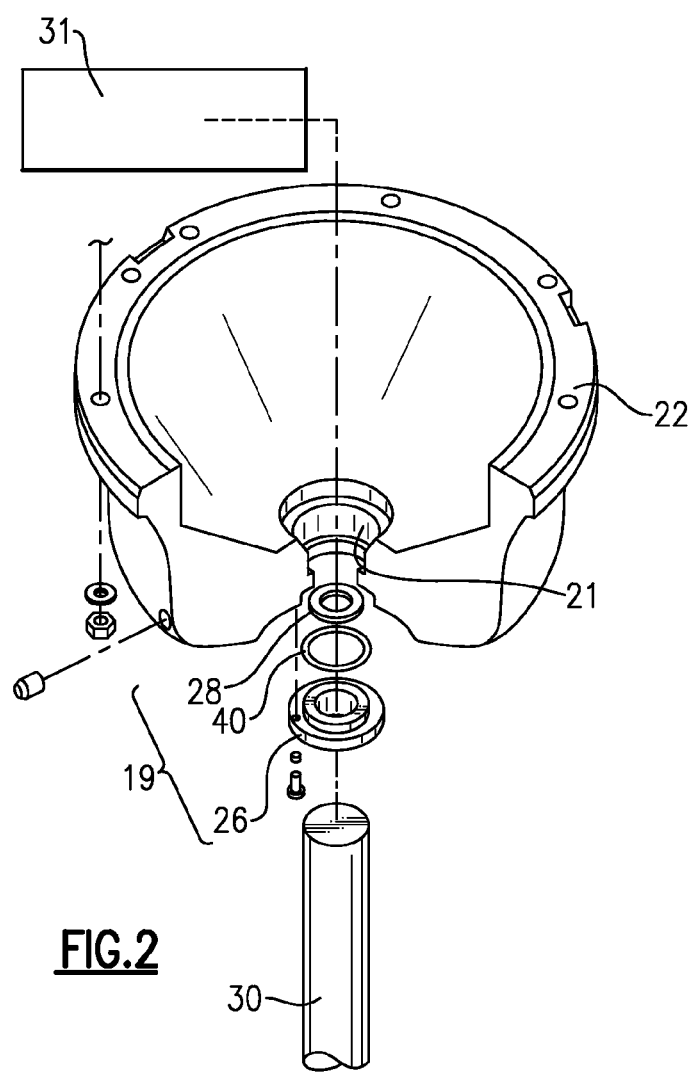
FIG. 2 shows a gearbox housing and a seal.

FIG. 2 is an exploded view showing the lower gearbox housing 22. As shown, a bore 21 extends outwardly of the housing. A seal assembly 19, incorporating an o-ring 40, a rotating ring 28, and a stationary seal portion 26, is received in the bore 21. The rotating ring 28 rotates with a shaft 30 which extends into the gear housing 22 and is connected to gears 31, which are shown schematically.

The purpose of the combined seal 19 is to prevent leakage of lubricant through the bore 21 while allowing the shaft 30 to rotate.

Figure 3:
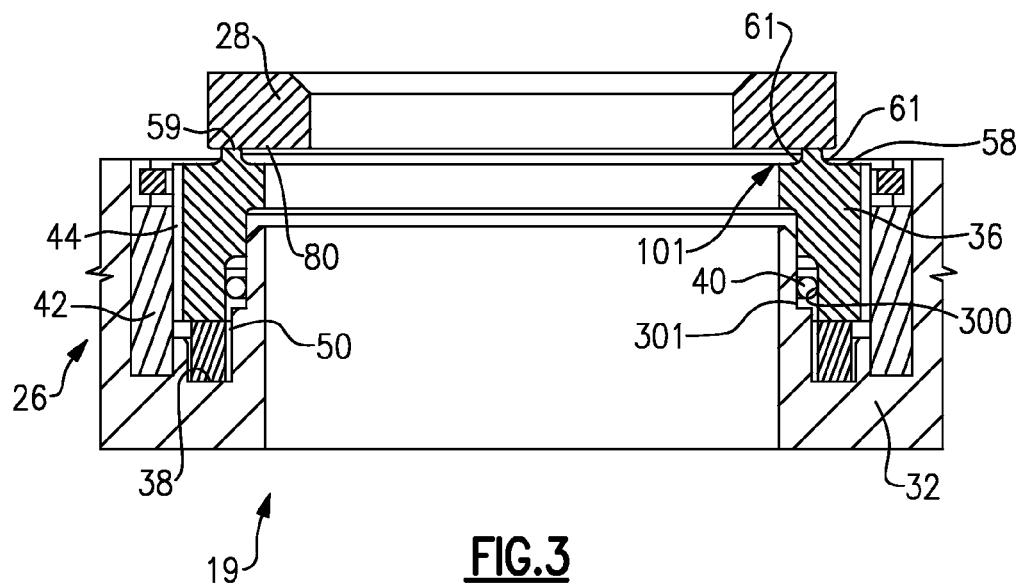
FIG. 3 is a cross-section of a seal.

FIG. 3 is a cross-section through the combined seal 19. As shown, a retainer 32 incorporates a plurality of pins 42 (see FIG. 4 also) which extend into the recesses 44 in a floating seal portion 36. The o-ring 40 is captured between a bore 301 located on retainer 32, and a counterbore 300 located on the floating seal portion 36. A channel 38 within the retainer 32 receives a spring 50, which is shown schematically in this Figure.

Figure 4:
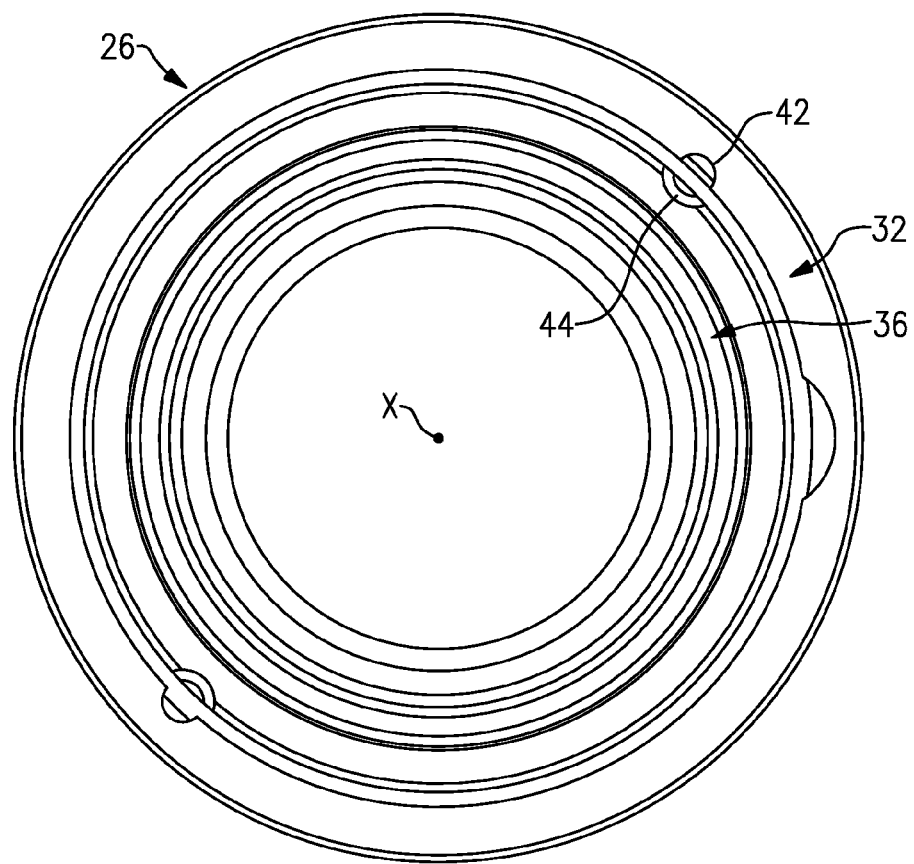
FIG. 4 is a top view of the seal.

FIG. 4 shows that there are pins 42 extending into recesses 44. The pins 42 prevent the floating seal portion 36 from rotating within the retainer 32. The pins 42 are disclosed as separate elements from the retainer 32, but can also be formed integrally. However, there is clearance between the pins 42 and the recesses 44 that will allow the floating seal portion 36 to move freely in a vertical direction, and to articulate about an axial centerline X, for limited angles. This allows floating seal portion 36 to move and conform to a mating rotating ring contact surface, as will be explained below.

Figure 5:
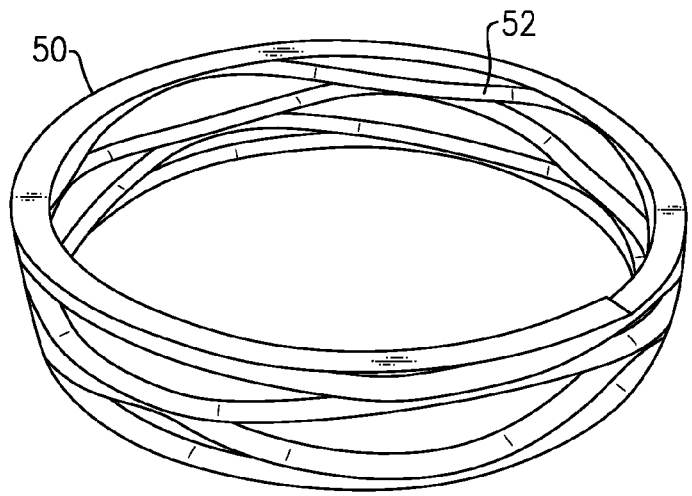
FIG. 5 shows a spring incorporated into the seal.

FIG. 5 shows that a single spring 50 is formed by a plurality of webs 52. The prior art generally included a plurality of springs biasing a floating seal portion towards a rotating ring. The use of a single spring simplifies the assembly and provides a uniform mechanical load distribution to the floating seal. One example spring is available from Smalley Steel Ring Co. of Lake Zurich, Ill. Of course, other springs can be utilized.

FIG. 3 shows a surface or sealing nose 59 formed at a fixed distance relative to inner peripheral surface 101 of the outer seal portion 58. Locating the sealing nose 59 at a specific location improves the operation of the seal, and provides an optimal pressure balance ratio between a hydraulic loading area and a sealing interface area.

FIG. 3 shows recesses 61 formed radially inward and outward of the sealing nose 59. Sealing nose 59 contacts a contact face 80 of the rotating ring 28.

The floating seal portion 36, and the rotating ring 28, may be generally formed of a silicon carbide material. Of course, there may be other materials included within each of these components. As one example only, the contact surface face 80 of the rotating ring 28 is formed with a hardened material, as shown in FIG. 6.

Figure 6:
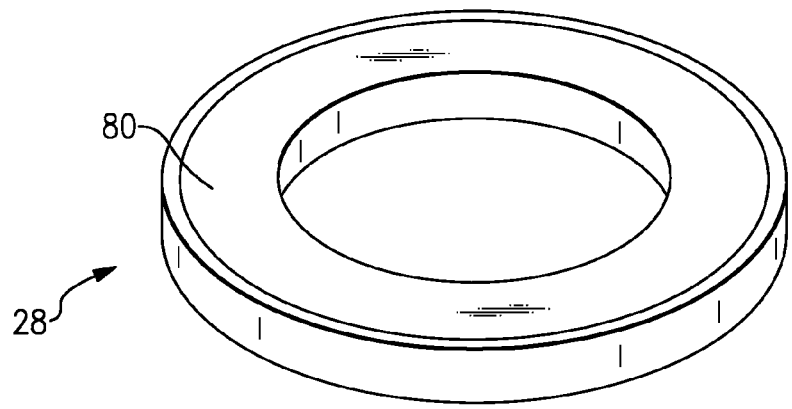
FIG. 6 shows a rotating ring.

FIG. 6 shows a detail of the rotating ring 28. A contact surface 80 is provided with a diamond material, which will decrease a co-efficient of friction, and increases surface hardness for the surface which is in contact with the sealing nose 59. In one embodiment, a polycrystalline structure diamond material is applied to the face. One acceptable material is available from Advanced Diamond Technologies of Romeoville, Ill.

The invention claimed is:

1. A seal assembly for use in a gearbox comprising:
   a rotating ring to be secured to a shaft, and having a contact face, said contact face facing a stationary seal; and
   the stationary seal including a retainer with a channel extending to a bottom, and a floating seal portion positioned in said retainer, with a spring positioned within the channel and between an inner end of said floating seal portion, and biasing said floating seal portion outwardly; and
   an inner bore of said retainer at said channel spaced from a radially outer periphery of said floating seal portion, and one of said inner bore and said radially outer periphery formed with a plurality of radially located pins, and the other of said inner bore and said radially outer periphery formed with a plurality of recesses, with said pins received in said recesses to prevent rotation of said floating seal portion within said retainer.

2. The seal assembly as set forth in claim 1, wherein said pins are in the inner periphery of said retainer, and said recesses are formed on said radially outer periphery of said floating seal portion.

3. The seal assembly as set forth in claim 1, wherein said floating seal portion is formed of a silicon-carbide material.

4. The seal assembly as set forth in claim 1, wherein an o-ring is captured between said retainer bore and a counterbore located on the floating seal portion.

5. The seal assembly as set forth in claim 1, wherein said spring is a single spring received in said channel inwardly of said floating seal portion.

6. The seal assembly as set forth in claim 5, wherein said single spring has a plurality of webs.

7. The seal assembly as set forth in claim 5, wherein said single spring extends around the full circumference of said channel.

8. The seal assembly as set forth in claim 1, wherein a sealing nose is formed on said floating seal portion at a fixed distance from the axial centerline.

9. The seal assembly as set forth in claim 8, wherein said floating seal portion includes a first nose recess formed radially inward of said sealing nose and extending circumferentially and a second nose recess formed radially outward of said sealing nose and extending circumferentially.

10. The seal assembly as set forth in claim 1, wherein said rotating ring is formed of a silicon carbide material.

11. The seal assembly as set forth in claim 1, wherein said rotating ring contact surface is provided with a diamond hardening surface material.

12. The seal assembly as set forth in claim 11, wherein said diamond material is a polycrystalline structured diamond material.

13. The seal assembly as set forth in claim 1, wherein said pins are in the inner periphery of said retainer, and said recesses are formed on said radially outer periphery of said floating seal portion, the floating seal portion is made of a silicon carbide material, and an o-ring is captured between said retainer bore and a counterbore in said floating seal portion, said spring is a single spring received in said channel inwardly of said floating seal portion, said single spring having a plurality of webs, a sealing nose formed on said floating seal portion at a fixed distance from the axial centerline, and said rotating ring is made of a silicon carbide material, and said contact surface provided with a diamond hardening surface material, and said diamond material being a polycrystalline structured diamond material.

14. A gearbox comprising:
a plurality of gears and a shaft connected to at least one of said gears, said gears and said shaft received in a gearbox housing including an upper gearbox housing and a lower gearbox housing, said lower gearbox housing including a bore and said shaft extending through said bore, and a seal assembly sealing said shaft at said bore; and the seal assembly having a rotating ring secured to the shaft, and having a contact face, said contact face abutting a stationary seal portion, the stationary seal portion including a retainer with a channel extending to a bottom, and a floating seal portion positioned in said retainer, with a spring positioned within the channel and between an inner end of said floating seal portion, and biasing said floating seal portion outwardly, an inner bore of said retainer at said channel spaced from a radially outer periphery of said floating seal portion, and one of said inner bore and said radially outer periphery having a plurality of radially located pins and the other of said inner bore and said radially outer periphery being formed with a plurality of recesses, with said pins received in said recesses to prevent rotation of said floating seal portion within said retainer.

15. The gearbox as set forth in claim 14, wherein said pins are on the inner periphery of said retainer, and said recesses are formed on said radially outer periphery of said floating seal portion.

16. The gearbox as set forth in claim 14, wherein said floating seal portion is formed of a silicon carbide material.

17. The gearbox as set forth in claim 14, wherein an o-ring is captured between said retainer bore and a floating seal portion counterbore.

18. The gearbox as set forth in claim 14, wherein said spring is a single spring received inwardly of said floating seal portion.

19. The gearbox as set forth in claim 18, wherein said single spring has a plurality of webs.

20. The gearbox as set forth in claim 14, wherein a sealing nose is formed on said floating seal portion at a fixed distance from the axial centerline and is in contact with said rotating ring contact surface.

21. The gearbox as set forth in claim 14, wherein said rotating ring is formed of a silicon carbide material.

22. The gearbox as set forth in claim 14, wherein said rotating ring contact surface is provided with a diamond hardening surface material.

23. The gearbox as set forth in claim 22, wherein said diamond material is a polycrystalline structured diamond material.

24. The gearbox as set forth in claim 14, wherein said pins are on the inner periphery of said retainer, and said recesses are formed on said radially outer periphery of said floating seal portion, said floating seal portion is made of a silicon carbide material, an o-ring is captured between said retainer bore and a counterbore in said floating seal portion, a single spring received in said channel inwardly of said floating seal portion, said single spring having a plurality of webs, a sealing nose formed on said floating seal portion at a fixed distance from the axial centerline and said rotating ring is made of a silicon carbide material, and said contact surface provided with a diamond hardening surface material, and said diamond material is a polycrystalline structured diamond material.

* * * * *